United States Patent [19]

Farrar et al.

[11] Patent Number: 4,509,987

[45] Date of Patent: Apr. 9, 1985

[54] CALCIUM CARBONATE DISPERSIONS

[75] Inventors: David Farrar, Bradford; Malcolm Hawe, Huddersfield, both of England

[73] Assignee: Allied Colloids Limited, Bradford, England

[21] Appl. No.: 442,343

[22] Filed: Nov. 17, 1982

[51] Int. Cl.³ .................. C01F 11/18; C09C 3/04
[52] U.S. Cl. .................. 106/308 Q; 106/308 M; 106/308 N; 241/16
[58] Field of Search ............ 106/306, 308 M, 308 Q, 106/308 N; 252/363.5; 241/16

[56] References Cited

U.S. PATENT DOCUMENTS

| | | | |
|---|---|---|---|
| 4,242,318 | 12/1980 | Brahm et al. | 106/306 |
| 4,279,661 | 7/1981 | Strauch et al. | 106/306 |
| 4,370,171 | 1/1983 | Robinson et al. | 106/308 N |
| 4,450,013 | 5/1984 | Hirsch et al. | 106/308 N |

*Primary Examiner*—M. J. Andrews
*Attorney, Agent, or Firm*—Lawrence Rosen

[57] ABSTRACT

Concentrated (e.g. above 72% by weight) dispersions of calcium carbonate ground to a particle size such that at least 87% by weight of the particles are less than 2 μm in size have a tendency to gel on standing. In the invention this tendency is minimized or eliminated by using, as dispersing agent, a copolymer of from 5 to 75% by weight AMPS and 95 to 25% by weight acrylic acid, or a water soluble salt thereof, having a molecular weight in the range 1000 to 20,000.

16 Claims, No Drawings

CALCIUM CARBONATE DISPERSIONS

It is standard practice to stabilise dispersions of particulate material in water by including a dispersing agent in the water.

Polyphosphates and low molecular weight sodium polyacrylates are often used as the dispersing agent for inorganic particulate materials. However there have been numerous proposals in the literature to use various copolymers as dispersing agents.

In U.S. Pat. No. 3,898,037 copolymers containing 2-acrylamido-2-methylpropane sulphonic acid (AMPS) or its water soluble salts are shown to be useful dispersants in various suspensions providing for resistance to calcium ions and having deflocculating ability. For example suspensions containing 0.1% of calcium carbonate are treated with copolymers of AMPS with acrylamide, disodium maleate, methacrylamide or N-methylolacrylamide.

In Japanese Patent Publication No. 160062/80 (Application 54274/79) it is proposed to disperse pigments using a water soluble copolymer of an ethylenically unsaturated carboxylic acid and an ethylenically unsaturated sulphonic acid, or salts thereof. Numerous sulphonated monomers are proposed, including vinyl sulphonic acid, allyl sulphonic acid and numerous others, including AMPS. The exemplified polymers are copolymers of methacrylic or acrylic acid with sodium polystyrene sulphonate in various proportions and, in one example, a copolymer of 80 parts methacrylic acid and 20 parts AMPS. The exemplified pigments are calcium carbonate, titanium oxide, zinc oxide, barium sulphate, and Indian Red, but numerous other pigments are also mentioned. It is apparent that the exemplified dispersing agents give dispersions that have a satisfactorily low viscosity and that are stable, that is to say the pigment particles do not settle out of the dispersions.

Most of the dispersions are relatively dilute but in one example the dispersions contain 77% barium sulphate. Since it was possible to obtain measurable viscosity values of the various dispersions containing barium sulphate, both with and without various dispersing agents, it is inevitable that the grade of barium sulphate was very coarse, with certainly much less than 80% by weight of the particles being less than 2 μm in size.

Particulate calcium carbonate traditionally has also been coarse and has not had the properties of optical whiteness, hiding power and coating characteristics that would render it suitable for use in paper coating applications. Accordingly more expensive fillers such as china clay and titania have had to be used instead. However as a result of recent developments in milling and dispersion processes (see for instance British Patent Specification No. 1,414,964 and U.S. Pat. No. 4,325,514) it is now possible to obtain calcium carbonate ground particles that are sufficiently fine that the calcium carbonate is of value in paper manufacture in place of some or all of the china clay or titania that has traditionally been used. The requirement in practice is that at least 87%, and generally at least 90%, by weight of the calcium carbonate particles should be less than 2 μm in size.

The greatly increased surface area that this finely ground calcium carbonate has compared to the traditional, coarse calcium carbonate causes a number of problems. Firstly, a dispersion in water at relatively high solids content can only be obtained if the milling process is conducted in the presence of a suitable dispersing agent. If there is no dispersing agent, or if the solids content is higher than can be tolerated with the dispersing agent that is present, a dispersion is not obtained and instead the particulate material agglomerates into a wet lump.

Polyphosphates and low molecular weight sodium polyacrylates have proved suitable for the initial formation of the finely ground calcium carbonate dispersions up to quite high solids contents. Typically the dispersion is formed in the presence of, as dispersing agent, 0.45%, by weight of the solids, of the sodium salt of a polyacrylic acid having a molecular weight of about 2800.

Another problem that arises from the use of finely ground calcium carbonate is that concentrated dispersions have a tendency to gel on standing to such an extent that the dispersion becomes non-flowable, even though it was flowable when formed initially. The particle size and concentration of finely ground calcium carbonate is critical in this respect. Dispersions having less than 87% by weight of the particles below 2 μm are much less liable to gel, at high solids concentrations, than dispersions containing more than 87% by weight of the particles below 2 μm. With the best dispersing agents available at present the maximum solids content of the finely ground calcium carbonate that can be provided in the dispersion while expecting the dispersion to remain flowable upon standing is about 72% by weight, and indeed there is a distinct tendency to gel unacceptably above this, especially with very finely ground calcium carbonate.

In order to reduce energy costs involved in transporting dilute slurries and to reduce the energy costs involved in drying paper coatings it would be desirable to be able to increase the concentration of finely ground calcium carbonate above the present commercial maximum of about 72%. However this has not, so far, been possible and so even if a dispersion is made initially at above 72% solids it has to be diluted for storage, so as to prevent gelling. This concentration limitation has been a serious impediment to the use of calcium carbonate as a pigment in the manufacture of paper.

This problem of gelling does not occur with coarsely ground particulate materials, such as the coarse barium sulphate used in the example of Japanese Patent Publication No. 160062/1980. If the barium sulphate is ground more finely than was apparently used in those examples it would have been impossible to obtain an aqueous dispersion of any sort, since a wet lump would have been formed instead.

Numerous proposals have appeared in the literature for dispersing agents for finely ground calcium carbonate dispersions and for other purposes but it does not seem that they have been adopted commercially to any significant extent for forming dispersions of finely ground calcium carbonate. The dispersing agents are often proposed as having the advantage that they are capable of giving a lower viscosity than the viscosity obtainable using conventional low molecular weight sodium polyacrylate. Although this might in theory appear advantageous from the point of view of final utility of the dispersions in practice it is liable to result in less efficient grinding of the calcium carbonate, since the grinding methods require that the grinding medium should be a fairly viscous liquid.

It has been our object to produce dispersions of high concentration of finely ground calcium carbonate and which have less tendency to become a non-flowable gel on standing, compared to the dispersions obtained using the dispersing agents that are commercially used at present.

In the invention a dispersion in water contains a dispersing agent and inorganic particulate material comprising calcium carbonate in the form of ground particles of which at least 87% by weight are less than 2 μm in size, and the particulate material in the dispersion is such that when the dispersing agent consists of 0.45%, by weight of the solids, of the sodium salt of polyacrylic acid of molecular weight 2800 the dispersion becomes a non-flowable gel on standing, and the dispersion is characterised in that it contains, as a dispersing agent, a copolymer of from 5 to 75% by weight AMPS and 95 to 25% by weight acrylic acid, or a water soluble salt thereof, having a molecular weight in the range 1000 to 20,000, and the dispersion remains as a flowable dispersion upon standing.

Thus in the invention it is possible, by the use of the defined copolymeric dispersing agent, to render the dispersion substantially non-gelling even though it would gel when the conventional polyacrylic acid type of dispersing agent was used as the sole dispersing agent.

In practical terms whether or not a dispersion remains flowable upon standing can be determined by visual observation. In commercial practice it is necessary that, when the container containing the dispersion is tipped, the dispersion should flow easily out of the container, irrespective of whether or not it has partially gelled in the container. The tendency of a dispersion to gel on standing can be measured quantitatively by recording the change of its gel strength or yield value with time. The yield value or gel strength is the shear stress that has to be applied to overcome the forces of interaction between the particles before flow can commence. Some increase in yield value with time can be tolerated but it must not be excessive.

Gelling of finely ground calcium carbonate dispersions is a particular problem, in industrial practice, because the production of such dispersions generally involves grinding the particles in an aqueous system (as opposed to merely adding dry particles to water) and commercial practice generally requires that the resultant dispersion shall be stored on site before use. After such storage the dispersion must be sufficiently flowable that it can be transported easily.

The inorganic particulate material in the dispersion generally consists solely of the finely ground calcium carbonate (i.e. ground to a particle size in which at least 87% by weight of the particles are less than 2 μm in size) in which event the dispersion will contain at least 72% by weight calcium carbonate. Dispersions of calcium carbonate in this concentration and fineness do, when formed using 0.45% sodium polyacrylate, become a non-flowable gel on standing. However it is possible to include in the dispersion other inorganic particulate material, generally of a similar particle size. This material may be added to a dispersion that, in the presence of sodium polyacrylate, would be gellable (i.e. that contains more than 72% by weight of the finely ground calcium carbonate). More usually however if other inorganic particulate material is to be combined with calcium carbonate it is added to a dispersion containing the calcium carbonate in an amount below that at which it would be gellable, if the dispersing agent was 0.45% sodium polyacrylate. For instance the dispersion could be formed of 60% finely ground calcium carbonate and sufficient talc or titania to render it gellable when the dispersing agent consists of 0.45% polyacrylic acid. Generally at least 50% by weight, and normally at least 80% by weight, of the inorganic particulate material is calcium carbonate and generally at least 87% by weight of all the particles in the dispersion are less than 2 μm in size. Generally any such other inorganic particulate material is added to a preformed dispersion of calcium carbonate.

The dispersion of calcium carbonate is preferably made by milling calcium carbonate mineral, for instance limestone, chalk whiting or, preferably marble, in water containing a dispersing agent. The dispersing agent present during the milling preferably is the defined copolymer of AMPS and acrylic acid. However it may sometimes be preferred to conduct the milling in the presence of a different dispersing agent, for instance the conventional low molecular weight sodium polyacrylate, and then to add the defined copolymer of AMPS and polyacrylic acid either soon after milling (before gelling occurs) or during the later stages of milling. Generally most or all of the AMPS-acrylic acid copolymer is added at the start of milling and any remaining amount that is required may be added after milling. The total amount of the copolymer that is present in the dispersion, during standing, is generally from 0.01 to 1%, most preferably 0.3 to 0.7%, solid copolymer based on dry solids.

The milling may be by any of the techniques that are suitable for forming the finely ground calcium carbonate such as the methods described in U.S. Pat. No. 4,325,514 or, more conveniently, ball milling or sand grinding as described in British Patent Specification No. 1123219. The preferred process involves sand grinding marble or other calcium carbonate mineral in water containing the chosen dispersing agent or dispersing agents followed by filtration to remove sand and coarse calcium carbonate particles.

The filtered dispersion has a solids content above 72% by weight. Typically the solids content can be in the range 74 to 80%, often 76 to 78% by weight. Preferably at least 90% w/w particles are less than 2 μm.

The copolymers preferably contain from 10 to 65% AMPS and 95 to 40% acrylic acid with 15 to 40, generally 15 to 25%, AMPS often being preferred on grounds of cost effectiveness in many situations. Best results may be obtained with polymers containing 20 to 60, generally 25 to 50%, AMPS and 80 to 40%, generally 75 to 50% acrylic acid. All these percentages are by weight calculated on the weight of AMPS free acid and acrylic acid. Either or both monomers may be present, during the polymerisation, as a water soluble salt and preferably the copolymer is in the form of a partial or full salt of each acid. The preferred salt forming cations are alkali metal and amine cations, especially sodium and ammonium.

The monomers from which the copolymer is formed may also include a minor amount, e.g. up to 10%, or at most 20%, by weight, of other copolymerisable monomers provided these do not substantially diminish the effectiveness of the copolymer.

The molecular weight of the copolymer is generally between 1000 and 10,000 with best results generally being obtained with values of 2,000 to 6,000. The copolymers are known materials and can be made by methods such as those described in U.S. Pat. No. 3,898,037.

The copolymers defined in the invention appear to have unique properties in that they are capable of providing a substantially non-gelling concentrated dispersion of finely ground calcium carbonate. Copolymers which are proposed in the literature as being equivalent to them, for instance the copolymers containing vinyl sulphonic acid or allyl sulphonic acid and mentioned in Japanese Publication No. 160062/80, are not capable of forming satisfactory non-gelling dispersions having a high solids content of finely ground calcium carbonate.

The following is an example.

EXAMPLE 1.5 kg of sand between 600 μm and 850 μm was mixed with 700 g of marble passing a No. 300 mesh B.S. sieve (0.053 mm) and 233 g of water added containing sufficient sodium polyacrylate homopolymer (Dispersing Agent A) to give a concentration of 0.45% dry polymer on dry marble. The slurry was ground in a sand grinder of the type disclosed in British Patent Specification No. 1,123,219 for about one hour to give a slip containing about 90% by weight of particles below 2 μm. The slip was passed through a 355 μm sieve and then through a 53 μm sieve.

The Brookfield viscosity of the slurry passing through was determined (Spindle No. 3, 50 rpm 20° C.) at 76.0% w/w solids content. The gel strengths of the 76.0% w/w solids slurry were determined at various time intervals by means of a Fann viscometer operating at 3 rpm.

The process was repeated or attempted with eight different dispersing agents (all in the form of their full sodium salts) as follows:

(A) Polyacrylate homopolymer.
(B) 20% AMPS, 80% acrylic acid copolymer
(C) 40% AMPS, 60% acrylic acid copolymer
(D) 60% AMPS, 40% acrylic acid copolymer
(E) 80% AMPS, 20% acrylic acid copolymer
(F) AMPS homopolymer
(G) Copolymer of 45% SMBA and 55% acrylic acid (see U.S. Pat. No. 4,256,660)
(H) Copolymer of 26% vinyl sulphonic acid and 74% acrylic acid With dispersing agents A to D the process was operated as described, and the viscosity and change in gel strength was recorded for the 76% slurries. However it proved to be impossible to form a 76% slurry with polymers E to H as the solids agglomerated into a moist lump at this concentration. The process was therefore repeated for polymers E to H at lower solids concentrations to determine the maximum solids content at which a slurry could be obtained.

The results are set out in the following table which shows the molecular weight of the polymer, the percentage of $CaCO_3$ particles below 2 μm, the Brookfield viscosity at 76% w/w or the maximum slurry solids, and the gel strength.

| Dispersing agent | Molecular weight Mw | Particle size (% <2 μm) | viscosity/ max. solids | Gel strength (lbs/100 ft²) | | |
|---|---|---|---|---|---|---|
| | | | | 0 min | 10 min | 30 min |
| A | 2800 | 90.0 | 922 cP | 4 | 44 | 93 |
| B | 3828 | 91.5 | 318 cP | 4 | 14 | 22 |
| C | 5728 | 92.2 | 172 cP | 2.5 | 3.5 | 4.5 |
| D | 4638 | 89.3 | 190 cP | 2 | 4 | 5 |
| E | 5284 | 89.5 | 73.8% w/w | — | — | — |
| F | 2900 | 47.6 | 68.4% w/w | — | — | — |
| G | 3749 | 85.0 | 74.5% w/w | — | — | — |
| H | 3281 | 88.0 | 72.2% w/w | — | — | — |

Visual inspection of the initial dispersions made using dispersing agents A to D showed that they were all satisfactory and that the lower viscosity of dispersions B to D were immaterial. The rapid increase in gel strength obtained with dispersing agent A however meant that that dispersion was wholly unsatisfactory for commercial use at this solids content. The dispersion obtained using dispersing agent B did not gel sufficiently to cause difficulty and so was commercially satisfactory. The dispersions obtained with dispersing agents C and D gelled even less and so are also satisfactory.

We claim:

1. A dispersion in water containing at least 72% by weight of the dispersion of inorganic particulate material comprising calcium carbonate in the form of ground particles of which at least 87% by weight are less than 2 μm in size and a dispersing agent comprising a copolymer of from 5 to 75% by weight AMPS and 95 to 25% by weight acrylic acid, or a water soluble salt thereof, having a molecular weight in the range 1,000 to 20,000, and the dispersion remains as a flowable dispersion upon standing.

2. A dispersion according to claim 1 containing at least 72% by weight inorganic particulate material of which at least 87% by weight is less than 2 μm in size.

3. A dispersion according to claim 1 in which the particulate material in the dispersion consists of at least 72%, by weight of the dispersion, of calcium carbonate in the form of ground particles of which at least 87% by weight are less than 2 μm in size.

4. A dispersion in water containing a dispersing agent and at least 72%, by weight of the dispersion, of calcium carbonate ground particles of which at least 87% by weight are less than 2 μm in size, and in which the dispersion contains, as a dispersing agent, a copolymer of from 5 to 75% by weight AMPS and 95 to 25% by weight acrylic acid, or a water soluble salt thereof, having a molecular weight in the range 1000 to 20,000 and the dispersion remains as a flowable dispersion upon standing.

5. A dispersion according to claim 4 in which the molecular weight of the said copolymer is from 2000 to 6000.

6. A dispersion according to claim 4 in which the said copolymer is of 15 to 40% AMPS and 85 to 60% acrylic acid, or a water soluble salt thereof.

7. A dispersion according to claim 4 in which the said copolymer is present as the sodium or ammonium salt.

8. A dispersion according to claim 4 having a calcium carbonate content of from 74 to 80% by weight.

9. A method of making a dispersion that remains flowable upon standing comprising grinding calcium carbonate in water containing a dispersing agent and then filtering the ground dispersion to yield a dispersion containing at least 72% by weight, based on the weight of dispersion, of ground calcium carbonate particles of which at least 87% by weight are less than 2 μm in size and then storing the dispersion, and in which the stored dispersion includes, as a dispersing agent, a copolymer of from 5 to 75% by weight AMPS and 95 to 25% by weight acrylic acid, or a water soluble salt thereof, having a molecular weight in the range 1000 to 20,000, and the dispersion remains as a flowable dispersion during the said storage.

10. A method according to claim 9 in which the milling is by sand grinding.

11. A method according to claim 9 in which the said copolymer is present throughout the milling.

12. A method according to claim 9 in which the amount of the said copolymer in the stored dispersion is from 0.01 to 1%.

13. A method according to claim 9 in which the calcium carbonate content of the filtered dispersion is from 74 to 80% by weight.

14. A method according to claim 9 in which the said copolymer has a molecular weight of from 2000 to 6000.

15. A method according to claim 9 in which the said copolymer is of 15 to 40% by weight AMPS and 85 to 60% by weight acrylic acid, or a water soluble salt thereof.

16. A method according to claim 9 in which the said copolymer is present as the sodium or ammonium salt.

* * * * *